US008687906B2

(12) United States Patent
Kubo et al.

(10) Patent No.: US 8,687,906 B2
(45) Date of Patent: Apr. 1, 2014

(54) IMAGE PROCESSING DEVICE, IMAGE PROCESSING METHOD, AND STORAGE MEDIUM FOR PERFORMING PSEUDO GRADUATION-INCREASED PROCESSING

(75) Inventors: Masahiko Kubo, Kanagawa (JP); Taro Yokose, Kanagawa (JP); Toshifumi Takahira, Kanagawa (JP); Jun Koyatsu, Kanagawa (JP); Hidetoshi Kawashima, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 243 days.

(21) Appl. No.: 13/240,640

(22) Filed: Sep. 22, 2011

(65) Prior Publication Data

US 2012/0230595 A1 Sep. 13, 2012

(30) Foreign Application Priority Data

Mar. 8, 2011 (JP) ................................. 2011-050292

(51) Int. Cl.
*G06K 9/36* (2006.01)
*G06K 9/46* (2006.01)
(52) U.S. Cl.
USPC ........................................................ 382/252
(58) Field of Classification Search
USPC ......... 382/164, 173, 218–220, 232, 233, 252, 382/274; 358/3.03, 456, 458, 465, 466, 358/521; 345/95, 98–100, 210, 211
See application file for complete search history.

(56) References Cited

U.S. PATENT DOCUMENTS

| 5,870,503 | A * | 2/1999 | Kumashiro ................... 382/252 |
| 6,067,066 | A * | 5/2000 | Kubota et al. ................... 345/98 |
| 6,714,693 | B1 * | 3/2004 | Miyake ........................ 382/300 |
| 7,791,766 | B2 * | 9/2010 | Hiramoto et al. ............ 358/3.19 |
| 2007/0041065 | A1 * | 2/2007 | Kubo et al. ................... 358/521 |
| 2012/0230595 | A1 * | 9/2012 | Kubo et al. ................... 382/232 |

FOREIGN PATENT DOCUMENTS

JP 2006-345435 A 12/2006

* cited by examiner

*Primary Examiner* — Amir Alavi
(74) *Attorney, Agent, or Firm* — Sughrue Mion, PLLC (57) ABSTRACT

An image processing device includes a first output unit that performs predetermined image processing for image data, and outputs image data having m bits per pixel; a second output unit that performs pseudo gradation-increase processing by a dither method or a multilevel error diffusion method for the output image data, and outputs image data having n bits per pixel, where n<m; and a compression unit that compresses the output image data. When a dither matrix for the dither method or a filter for the multilevel error diffusion method used by the second output unit for the pseudo gradation-increase processing is divided into plural pixel groups each including plural adjacent pixels and when each pixel group serves as a unit, processing parameters respectively set for pixels in the same pixel group are similar as compared with processing parameters respectively set for pixels in different pixel groups.

10 Claims, 5 Drawing Sheets

| 0 | 0 | 2 | 2 | n LINES |
|---|---|---|---|---|
| 0 | 0 | 2 | 2 | n+1 LINES |
| 3 | 3 | 1 | 1 | n+2 LINES |
| 3 | 3 | 1 | 1 | n+4 LINES |

FIG. 3B

| 10 | 10 | 10 | 12 | 14 | 16 |
|----|----|----|----|----|----|
| 10 | 10 | 10 | 12 | 14 | 16 |
| 10 | 10 | 10 | 12 | 14 | 16 |
| 10 | 10 | 10 | 12 | 14 | 20 |
| 10 | 10 | 10 | 12 | 20 | 20 |

FIG. 3C

| 40 | 40 | 40 | 48 | 56 | 64 |
|----|----|----|----|----|----|
| 40 | 40 | 40 | 48 | 56 | 64 |
| 40 | 40 | 40 | 48 | 56 | 64 |
| 40 | 40 | 40 | 48 | 56 | 80 |
| 40 | 40 | 40 | 48 | 80 | 80 |

FIG. 3D

| 42 | 42 | 42 | 51 | 62 | 70 |
|----|----|----|----|----|----|
| 42 | 42 | 42 | 51 | 62 | 70 |
| 42 | 42 | 42 | 51 | 62 | 70 |
| 42 | 42 | 42 | 51 | 62 | 100 |
| 42 | 42 | 42 | 51 | 100 | 100 |

FIG. 3E

AVERAGE PIXEL VALUE = 11.0625

| 10.5 | 10.5 | 10.5 | 12.75 | 15.5 | 17.5 |
|------|------|------|-------|------|------|
| 10.5 | 10.5 | 10.5 | 12.75 | 15.5 | 17.5 |
| 10.5 | 10.5 | 10.5 | 12.75 | 15.5 | 17.5 |
| 10.5 | 10.5 | 10.5 | 12.75 | 15.5 | 25 |
| 10.5 | 10.5 | 10.5 | 12.75 | 25 | 25 |

FIG. 3F

| 42 | 42 | 44 | 53 | 62 | 70 |
|----|----|----|----|----|----|
| 42 | 42 | 44 | 53 | 62 | 70 |
| 45 | 45 | 43 | 52 | 65 | 73 |
| 45 | 45 | 43 | 52 | 65 | 101 |
| 42 | 42 | 44 | 53 | 100 | 100 |

PIXEL VALUES ARE LOCALLY SAVED

FIG. 3G

AVERAGE PIXEL VALUE = 11.125

| 10 | 10 | 11 | 13 | 15 | 17 |
|----|----|----|----|----|----|
| 10 | 10 | 11 | 13 | 15 | 17 |
| 11 | 11 | 10 | 13 | 16 | 18 |
| 11 | 11 | 10 | 13 | 16 | 25 |
| 10 | 10 | 11 | 13 | 25 | 25 |

10-BIT GRADATION IS PROBABILISTICALLY REPRODUCED WITHIN WINDOW OF DITHER MATRIX WITH 4X4 PIXELS BY DITHER

RESOLUTION AT EDGE OF IMAGE IS NOT CHANGED BY DITHER

IMAGE PROCESSING DEVICE, IMAGE PROCESSING METHOD, AND STORAGE MEDIUM FOR PERFORMING PSEUDO GRADUATION-INCREASED PROCESSING

CROSS-REFERENCE TO RELATED APPLICATIONS

This application is based on and claims priority under 35 USC 119 from Japanese Patent Application No. 2011-050292 filed Mar. 8, 2011.

BACKGROUND

The present invention relates to an image processing device, an image processing method, and a storage medium.

SUMMARY

According to an aspect of the invention, there is provided an image processing device including a first output unit that performs predetermined image processing for image data, and outputs image data having m bits per pixel; a second output unit that performs pseudo gradation-increase processing by a dither method or a multilevel error diffusion method for the image data output from the first output unit, and outputs image data having n bits per pixel, where n<m; and a compression unit that compresses the image data output from the second output unit. When a dither matrix that the second output unit uses for the pseudo gradation-increase processing by the dither method or a filter that the second output unit uses for the pseudo gradation-increase processing by the multilevel error diffusion method is divided into plural pixel groups each including plural adjacent pixels and when each of the pixel groups serves as a unit, processing parameters of the dither matrix or the filter respectively set for pixels in the same pixel group are similar to each other as compared with processing parameters respectively set for pixels in different pixel groups.

BRIEF DESCRIPTION OF THE DRAWINGS

Exemplary embodiment(s) of the present invention will be described in detail based on the following figures, wherein.

DETAILED DESCRIPTION

Figure 1:
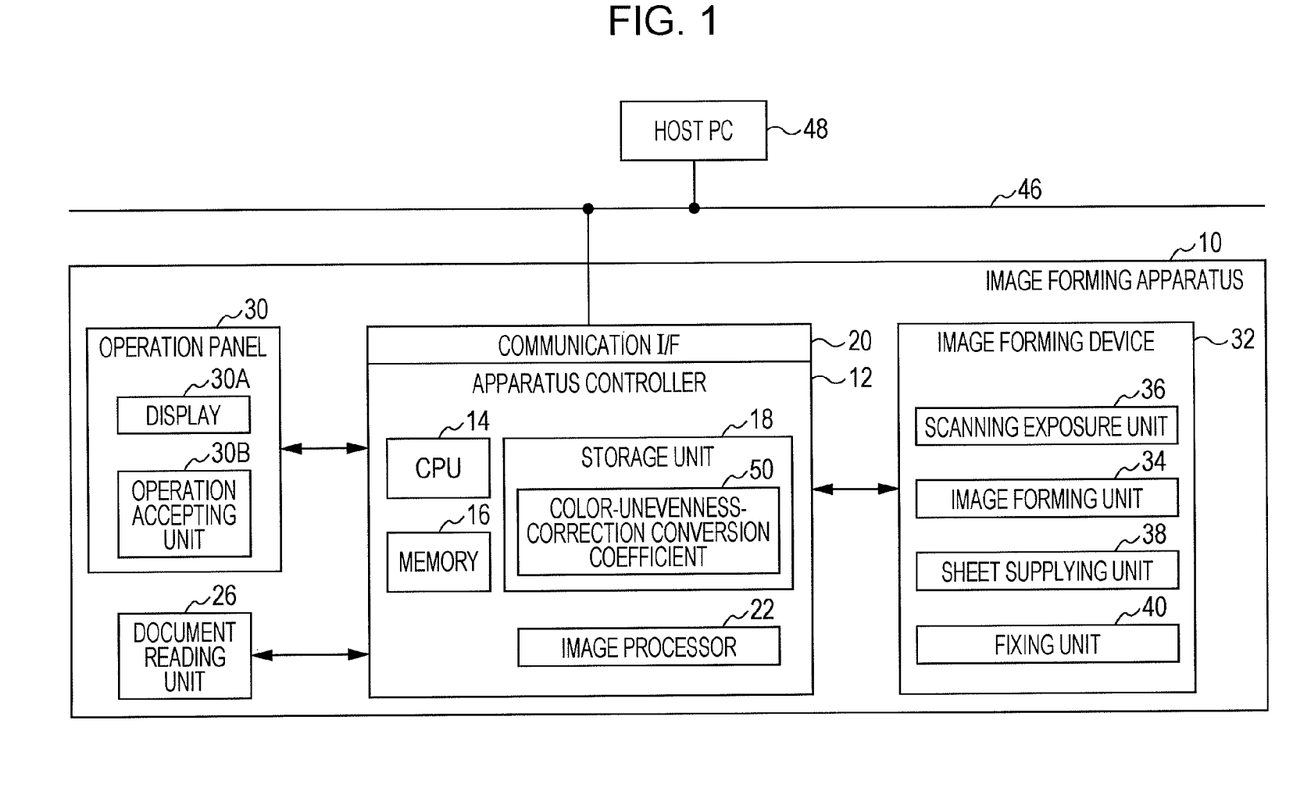
FIG. 1 is a block diagram schematically showing a configuration of an image forming apparatus described in an exemplary embodiment.

Exemplary embodiments of the present invention will be described below with reference to the accompanying drawings.
First Exemplary Embodiment
A first exemplary embodiment of the present invention will be described below with reference to the accompanying drawings. FIG. 1 illustrates an image forming apparatus 10 according to this exemplary embodiment. The image forming apparatus 10 includes an apparatus controller 12 that functions as an example of an image processing device according to an exemplary embodiment of the present invention. The apparatus controller 12 includes a microcomputer. The apparatus controller 12 includes a CPU 14; a memory 16; a non-volatile storage unit 18 that is formed of, for example, a hard disk drive (HDD) or a flash memory, and stores an apparatus control program (not shown) for controlling operations of respective units of the image forming apparatus 10; and a communication interface (I/F) 20 that is connected with a host PC 48 through a communication line 46.

The apparatus controller 12 receives image data expressing an image to be formed on a sheet, from the host PC 48 through the communication line 46. Also, the apparatus controller 12 includes an image processor 22 that performs image processing including color-unevenness correction (the detail will be described later). The storage unit 18 of the apparatus controller 12 stores a color-unevenness-correction conversion coefficient 50 that is used when the image processor 22 performs the image processing (the detail will be described later).

The image forming apparatus 10 includes a document reading unit 26, an operation panel 30, and an image forming device 32 that are connected with the apparatus controller 12. The document reading unit 26 reads an image on a set document, and outputs image data that is obtained by reading to the apparatus controller 12. The operation panel 30 includes a display 30A that is formed of a liquid crystal display (LCD) or the like and displays various information, and an operation accepting unit 30B that includes plural keys and accepts an information input operation by a user. The apparatus controller 12 controls displaying of information on the display 30A. Information input by the user and accepted by the operation accepting unit 30B is input to the apparatus controller 12.

The image forming device 32 forms an image expressed by the image data input from the apparatus controller 12, by using a toner as a colorant based on an electrophotographic system, transfers the image on a sheet, and fixes the image to the sheet. The image forming device 32 includes an image forming unit 34, a scanning exposure unit 36, a sheet supply unit 38, and a fixing unit 40. The image forming unit 34 includes a photoconductor member. A charging unit that electrically charges the photoconductor member, a developer that develops an electrostatic latent image formed on the photoconductor member by using a toner and hence forms a toner image, a transfer unit that transfers the toner image formed on the photoconductor member on a sheet, and a charge eliminating and cleaning unit that eliminates charge on the photoconductor member and cleans the photoconductor member, are provided around the photoconductor member in that order.

To be more specific, the apparatus controller 12 inputs image data of respective colors including cyan (C), magenta (M), yellow (Y), and black (K) to the image forming device 32. The image forming device 32 forms images of the respective colors including C, M, Y, and K expressed by the input image data (image data formed by assigning 8 bits to each of the respective colors including C, M, Y, and K of each pixel of an image, and expressing a color of each pixel of the image by a combination of 8-bit values of the respective colors including C, M, Y, and K) through an electrophotographic system using toners of the respective colors of the respective colors including C, M, Y, and K, and forms an image in which the formed images of the respective colors including C, M, Y, and K are superposed on one another. The image in which the images of the respective colors including C, M, Y, and K are superposed on one another is formed such that four image forming units 34 for the respective colors including C, M, Y, and K are provided, images of the respective colors including C, M, Y, and K are formed by the image forming units 34, and the formed images are superposed on one another; or such that a single image forming unit 34 including developers of the respective colors including C, M, Y, and K is provided, images of the respective colors including C, M, Y, and K are successively formed, and the formed images are superposed on one another.

The scanning exposure unit 36 includes an exposure light source that is formed of, for example, a semiconductor laser or a LED. The scanning exposure unit 36 modulates an exposure light beam emitted from the exposure light source in accordance with image data input from the apparatus controller 12, irradiates the photoconductor member of the image forming unit 34 with the exposure light beam, and hence forms an electrostatic latent image on the photoconductor member. If the four image forming units 34 corresponding to the respective colors including C, M, Y, and K are provided, the scanning exposure unit 36 includes four exposure light sources corresponding to the respective colors including C, M, Y, and K such that exposure light beams respectively emitted from the individual exposure light sources are modulated in accordance with image data of different colors and the photoconductor members of the different image forming units 34 are irradiated with the modulated exposure light beams. In contrast, if only the single image forming unit 34 is provided, the scanning exposure unit 36 modulates an exposure light beam emitted from a single exposure light source successively in accordance with image data of the respective colors including C, M, Y, and K, and the photoconductor member of the image forming unit 34 is irradiated with the modulated exposure light beams.

The sheet supply unit 38 takes a sheet stacked on a sheet stack portion and transports the sheet to the transfer unit of the image forming unit 34. The fixing unit 40 fixes an image to a sheet by heating the sheet with a toner image transferred thereon and melting a toner by the transfer unit of the image forming unit 34.

Figure 2:
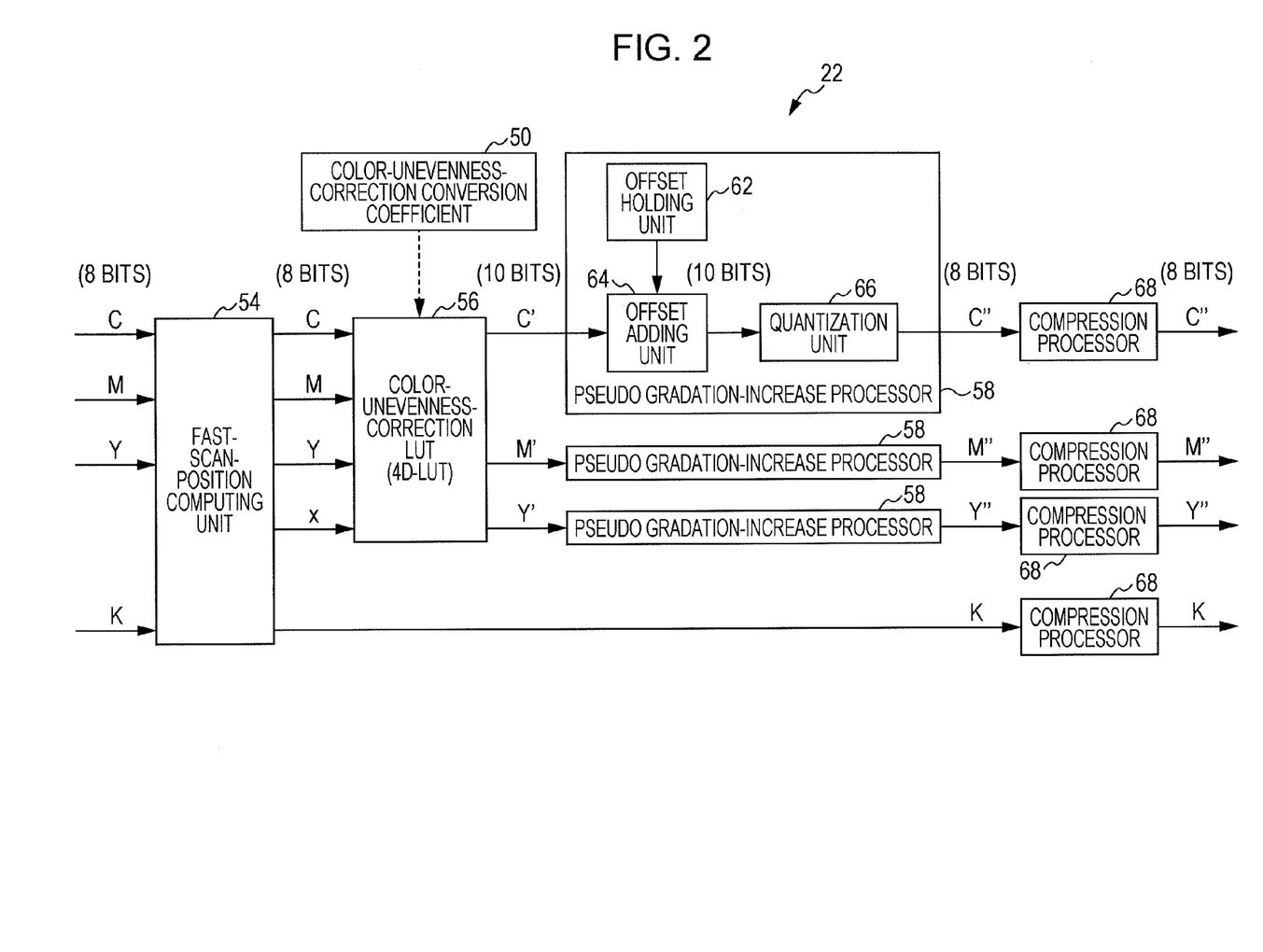
FIG. 2 is a block diagram schematically showing a configuration of an image processing device according to a first exemplary embodiment.

The image processor 22 provided in the apparatus controller 12 is a processor that performs image processing including color-unevenness correction for image data received from the host PC 48 or image data input when the document reading unit 26 reads an image on a document (hereinafter, referred to as input image data), and forms image data with which the image forming device 32 forms an image on a sheet (hereinafter, referred to as output image data). As shown in FIG. 2, the image processor 22 includes a fast-scan-position computing unit 54, a color-unevenness correction lookup table (LUT) 56, a pseudo gradation-increase processor 58, and a compression processor 68.

Described in this first exemplary embodiment is an aspect in which the fast-scan-position computing unit 54, the color-unevenness-correction LUT 56, the pseudo gradation-increase processor 58, and the compression processor 68 that form the image processor 22 are provided in forms of hardware (electronic circuit). However, processing realized by the fast-scan-position computing unit 54, the color-unevenness-correction LUT 56, the pseudo gradation-increase processor 58, and the compression processor 68 may be realized according to an aspect in which a CPU of a computer (for example, the apparatus controller 12) executes a program. The program in this aspect is an example of an image processing program according to an exemplary embodiment of the present invention. The program in this aspect may be previously stored on (installed in) the storage unit 18. Alternatively, the program may be provided in a form of a storage medium, such as a CD-ROM or a DVD-ROM.

The fast-scan computing unit 54 of the image processor 22 receives input image data pixel by pixel in order of a raster. In this exemplary embodiment, 8 bits (gradation resolution=256 levels) is assigned to each of the respective colors including C, M, Y, and K of each pixel of an image as input image data, and image data that a color of each pixel of the image is expressed by a combination of 8-bit values of the four colors including C, M, Y, and K is used. The fast-scan-position computing unit 54 outputs the image data input pixel by pixel in order of the raster without changing the values, counts the number of pixels with the data input line by line along a fast scan direction, and outputs the count value as a fast-scan position x of a pixel to which the data is output.

The color-unevenness-correction conversion coefficient 50 stored in the storage unit 18 is set in the color-unevenness-correction LUT 56. Also, data of three colors including C, M, and Y excluding K from among the data output from the fast-scan-position computing unit 54 is input to the color-unevenness-correction LUT 56 pixel by pixel in order of the raster, and the fast-scan position x is input to the color-unevenness-correction LUT 56. The color-unevenness-correction LUT 56 assigns the input combination of the values of the three colors including C, M, and Y and the input fast-scan position x to each of the respective colors including C, M, and Y at 10 bits (gradation resolution=1024 levels) per pixel of the image based on the color-unevenness-correction conversion coefficient 50, converts the value into a value (C', M', Y') of the three colors including C, M, and Y3 obtained by correcting color unevenness of the respective colors including C, M, and Y in accordance with the fast-scan position x, and outputs the converted value. As described above, the color-unevenness-correction LUT 56 is formed of 4D LUT (4-input 3-output LUT).

The color unevenness subjected to the correction by the color-unevenness-correction LUT 56 may be detected such that the image forming device 32 forms an image, in which plural color charts are arrayed, on a sheet, the color charts having strip-like shapes extending over the whole width of an image formation range by the image forming device 32 and having different colors (in which a value of at least one of the three colors including C, M, and Y differs from one another and K=0); and colors of each color chart are measured at plural positions different in the fast scan direction.

However, the LUT holds a conversion coefficient that associates input data with output data, only for a predetermined grid point in an input data space with a number of dimensions corresponding to the number of pieces of the input data (for example, if the number of pieces of input data is four, the input data space becomes 4D), and computes output data for input data that is located between grid points in the input data space, by using conversion coefficients of plural grid points existing around that grid point through interpolation computation. Hence, based on the result in which the color unevenness is detected as described above, for the color (values of the three colors including C, M, Y) and the fast-scan position x corresponding to each of grid points of the color-unevenness-correction LUT 56, for example, the color-unevenness-correction conversion coefficient 50 may be generated by computing values (C', M', Y') of the three colors including C, M, and Y after the color-unevenness correction, and associating the computed values C', M', and Y' with the corresponding values of the three colors including C, M, and Y and the fast-scan position x corresponding to each of the grid points. Alternatively, a color-prediction model that uses four variables including the values of the three colors including C, M, and Y and the fast-scan position x as input data, may be generated based on the colorimetric result of the color charts, and the color-unevenness-correction conversion coefficient 50 may be generated by using the color-prediction model. Still alternatively, the color-unevenness-correction conversion coefficient 50 may be generated by a method of related art.

The color-unevenness-correction LUT 56 is an example of a first output unit according to an exemplary embodiment of the invention. The color-unevenness correction realized by the color-unevenness-correction LUT 56 is an example of predetermined image processing according to an exemplary embodiment of the invention and correction processing according to an exemplary embodiment of the invention. Also, the fast-scan position x input to the color-unevenness-correction LUT 56 is an example of position data according to an exemplary embodiment of the invention. The image data output from the color-unevenness-correction LUT 56 is an example of "image data having m bits per pixel (where m= 10)." The first output unit does not have to be realized by the color-unevenness-correction LUT 56, and may be realized by a color-management LUT (for example, 4D LUT for CMYK-to-CMYK conversion, 3D LUT for RGB-to-CMYK conversion or L*a*b*-to-CMYK conversion, 1D LUT for gradation adjustment and calibration, or the like).

Three pseudo gradation-increase processors 58 are provided to correspond to data of the respective colors including C, M, and Y output from the color-unevenness-correction LUT 56. Data with mutually different colors of the three colors including C, M, and Y is input to the three pseudo gradation-increase processor 58 pixel by pixel in order of the raster. The pseudo gradation-increase processor 58 according to the first exemplary embodiment performs pseudo gradation-increase processing by a dither method for data (C', M', Y') having 10 bits per pixel per color expressing one of the three input colors including C, M, and Y; and outputs data having 8 bits per pixel per color pixel by pixel in order of the raster.

Figure 3A:
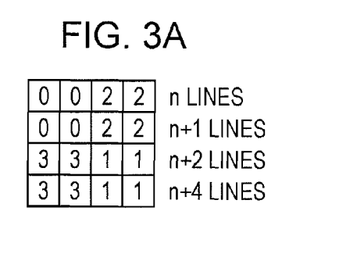
FIGS. 3A to 3G are schematic illustrations showing examples of processes and results of the image forming device according to the first exemplary embodiment.

To be more specific, each of the pseudo gradation-increase processors 58 includes an offset holding unit 62 that holds a dither matrix (an example thereof is shown in FIG. 3A) having set therein offset values; an offset adding unit 64 that performs offset adding processing (pseudo gradation-increase processing by the dither method) of adding the offset values set in the dither matrix held in the offset holding unit 62 to data of plural pixels; and a quantization unit 66 that performs quantization processing of converting the data having 10 bits per pixel per color output from the offset adding unit 64 into data having 8 bits per pixel per color (by rounding down 2 lower-order bits). The pseudo gradation-increase processor 58 is an example of a second output unit according to an exemplary embodiment of the invention.

Four compression processors 68 are provided to correspond to data of C", M", and Y" having 8 bits per pixel per color output from the pseudo gradation-increase processor 58, and data of K having 8 bits per pixel per color output from the fast-scan-position computing unit 54. Mutually different data included in C", M", Y", and K is input respectively to the compression processors 68 pixel by pixel in order of the raster. Each of the compression processors 68 performs compression processing of compressing the input data by lossless compression based on continuity of values of an input color (any of C", M", Y", and K) of pixels arranged on an image in order of the raster. A compression method in the above-described compression processing may employ any of methods of related art provided for lossless compression. Since the compression processor 68 performs the lossless compression, image quality is not degraded by the compression processing, and the image forming device 32 provides an output with high image quality.

The compressed data of C", M", Y", and K output from the compression processors 68 is transferred to the image forming device 32, is decompressed by the image forming device 32, and is used for image formation by the image forming device 32 using the toners of the respective colors including C, M, Y, and K. Each of the compression processors 68 is an example of a compression unit according to an exemplary embodiment of the invention.

Next, an operation of the first exemplary embodiment is described. When an image is formed by an electrophotographic system like the image forming device 32 of the image forming apparatus 10 according to this exemplary embodiment, color uniformity in a plane of an image is generally low. A maximum color difference in a plane when a solid image with a uniform color in the entire plane of the image is formed may be larger than that of other image formation system. Also, when color unevenness of image data with a gradation resolution of 8 bits per pixel per color is corrected without the gradation resolution (the number of bits per pixel per color) is not changed, a correction error of the color-unevenness correction as the result of insufficiency in gradation resolution may be visually recognized as a pseudo contour on the image.

In contrast, with the technique of related art, when color-unevenness correction is performed with a gradation resolution of 10 bits for image data by LUT, image data having 10 bits per pixel per color is obtained, and the image data is quantized into image data having 8 bits per pixel per color, pseudo gradation-increase processing is performed. The pseudo gradation-increase processing diffuses a difference between a value before the conversion and a value after the conversion (quantization error) into plural neighboring pixels by a multilevel error diffusion method. Accordingly, the color-unevenness correction regarding nonlinearity such as gradation characteristics and multi-layer transfer characteristics in the electrophotographic system is realized. The uniformity of a color in a plane of an image is increased, and the pseudo contour is prevented from being visually recognized.

When the image data is transferred to the image forming device, compression processing is generally performed for image data to decrease time required for transferring the image data. According to an experiment (the detail will be described later) executed by the inventors of the subject application, when the pseudo gradation-increase processing by, for example, a multilevel error diffusion method like the technique of related art is performed, a compression rate when image data is compressed becomes markedly decreased. The volume of the image data after the compression processing may be about 20 to about 30 times the volume when the pseudo gradation-increase processing is not performed.

It is expected that the compression rate is decreased because a value of a color in each pixel of an image is redundant, i.e., values of colors of adjacent pixels on an image are less similar to each other. The compression of the image data is based on that the colors of the adjacent pixels are the same or similar to each other in a major part of the image. By using continuity of the colors of the adjacent pixels, for example, if pixels with the same color are continuously arranged, data holding the values of the colors respectively for the pixels is replaced with data holding a value of a color only for a leading pixel and the number of continuously arranged pixels having the same color. For example, if pixels having colors similar to each other are continuously arranged, data holding values of the colors respectively for the pixels is replaced with data holding the value of the color of the leading pixel and only differences between the value of the color of the leading pixel and colors of pixels having colors similar to each other.

In contrast, in the pseudo gradation-increase processing by the technique of the related art, values obtained by multiplying quantization errors by different error diffusion coefficients are added to plural neighboring pixels, so that the quantization errors are diffused to the neighboring plural pixels. The similarity of the values of the colors of the pixels adjacent to each other on the image is decreased by the processing. Thus, a compression rate for image data is decreased.

In light of the situation, the first exemplary embodiment performs the pseudo gradation-increase processing by the dither method by the pseudo gradation-increase processor 58. Also, a dither matrix used for the pseudo gradation-increase processing by the dither method is a dither matrix in which, when pixels that form the dither matrix are divided into plural pixel groups each including adjacent plural pixels, the same offset value is set for the pixels while each pixel group serves as a unit, and a different offset values is set for a pixel in a different pixel group.

FIG. 3A illustrates an example of a dither matrix used in the first exemplary embodiment. The dither matrix shown in FIG. 3A is a matrix defined by 4 pixels in a fast scan direction (left-right direction in FIGS. 3A to 3G)×4 pixels in a slow scan direction (up-down direction in FIGS. 3A to 3G) (16 pixels in total). Adjacent 4 pixels (2 pixels in the fast scan direction×2 pixels along slow scan) form a pixel group serving as a unit, and thus, the matrix is divided into 4 pixel groups. Different offset values 0, 2, 3, and 1 are set respectively for the pixel groups. The same offset value is set for pixels in the same pixel group. Now, the pseudo gradation-increase processing by the dither method performed by the pseudo gradation-increase processor 58 is described according to an example in which the dither matrix shown in FIG. 3A is used.

Figure 3B:
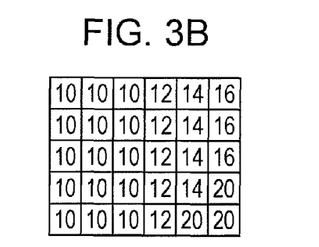
Figure 3C:
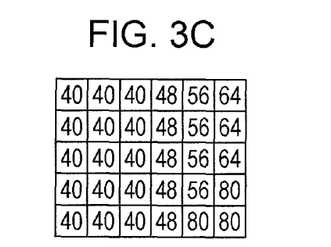
Figures 3D, 3E:
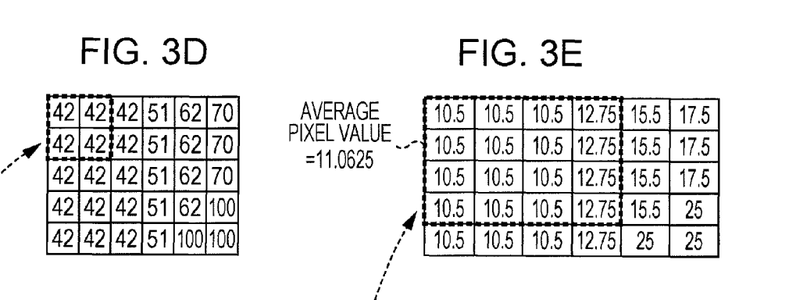

FIG. 3B illustrates an example of image data input to the color-unevenness-correction LUT 56 (image data having 8 bits (gradation resolution=256 levels) per pixel per color)). FIG. 3C illustrates values of pixels of the image data in FIG. 3B. FIG. 3C illustrates values of pixels of image data when the image data shown in FIG. 3B is converted into image data having 10 bits (gradation resolution=1024 levels) per pixel per color. FIG. 3D illustrates an example of image data having 10 bits per pixel per color, the data which is output from the color-unevenness-correction LUT 56 and input to the pseudo gradation-increase processor 58. Differences between the values of the pixels in the image data shown in FIG. 3D and the values of the pixels in the image data shown in FIG. 3C corresponds to correction amounts provided by the color-unevenness correction by the color-unevenness-correction LUT 56. FIG. 3E illustrates values when the values of the pixels in the image data shown in FIG. 3D are divided by 4 and the values with numbers after the decimal points are not rounded down, and hence values of respective pixels in image data shown in FIG. 3E which are values of pixels in image data having 8 bits per pixel per color and pseudo values exceeding a range of the values.

Figure 3F:
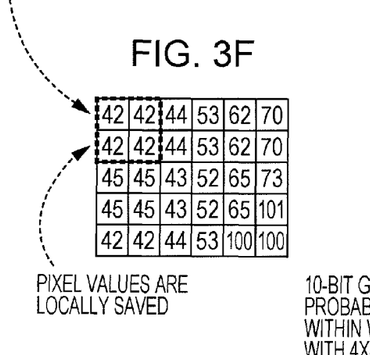

The offset adding unit 64 of the pseudo gradation-increase processor 58 performs offset adding processing in which the offset value set in the dither matrix held by the offset holding unit 62 is added to data of plural pixels. If it is assumed that the dither matrix shown in FIG. 3A is held in the offset holding unit 62, offset values of the dither matrix shown in FIG. 3A are respectively added while 4×4 pixels (16 pixels in total) serve as a unit. Hence, the offset adding unit 64 outputs image data shown in FIG. 3F (FIG. 3F shows an example of 10-bit image data output from the pseudo gradation-increase processor 58). Then, the quantization unit 66 performs the quantization processing of rounding down 2 lower-order bits of the data having 10 bits per pixel per color output from the offset adding unit 64. Hence, the quantization unit 66 outputs image data shown in FIG. 3G (FIG. 3G shows an example of 8-bit image data output from the quantization unit 66).

The pseudo gradation-increase processing by the dither method is processing that prevents a quantization error from being periodically generated and prevents the quantization error from being visually recognized, by intentionally adding a noise to the original data (pattern of offset values defined by the dither matrix). Comparing the image data shown in FIG. 3G with the image data shown in FIG. 3E, it is found that an average pixel value of 16 pixels surrounded by a broken line of the image data shown in FIG. 3E is "11.0625," whereas an average pixel value of corresponding 16 pixels surrounded by a broken line of the image data shown in FIG. 3G is "11.125." The quantization error is restricted, and accordingly, gradation of data having 10 bits per pixel per color is probabilistically reproduced.

Figure 3G:
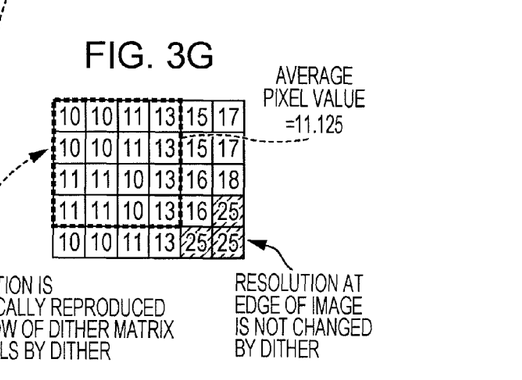

Values in 3 pixels at the lower right corner of the image data shown in FIG. 3G are "25," like the image data shown in FIG. 3E. An edge of an image is prevented from being unsharpened by performing the pseudo gradation-increase processing by the dither method.

Further, the image data shown in FIG. 3D, all values of pixels in a left half region (region with 3 pixels in the fast scan direction and 5 pixels in the slow scan direction) are "42." In a typical dither matrix, different values are set as offset values for pixels of the dither matrix. Hence, when the pseudo gradation-increase processing by the dither method is performed by using the typical dither matrix, the pixels in the region have different values. This may result in that compression rate of image data by downstream compression processing may be decreased.

In contrast, in the first exemplary embodiment, as shown in FIG. 3A, since the pseudo gradation-increase processing by the dither method is performed by using the dither matrix in which the same offset value is set for adjacent 4 pixels. Accordingly, as surrounded by a broken line in FIG. 3F, a region in which values of plural adjacent pixels are not changed from original values (see a region of 4 pixels at the upper left corner) is generated. As compared with a case in which a dither matrix having different offset values respectively set for pixels is used, the compression rate of image data in the downstream compression processing is increased.

Second Exemplary Embodiment

Figure 4:
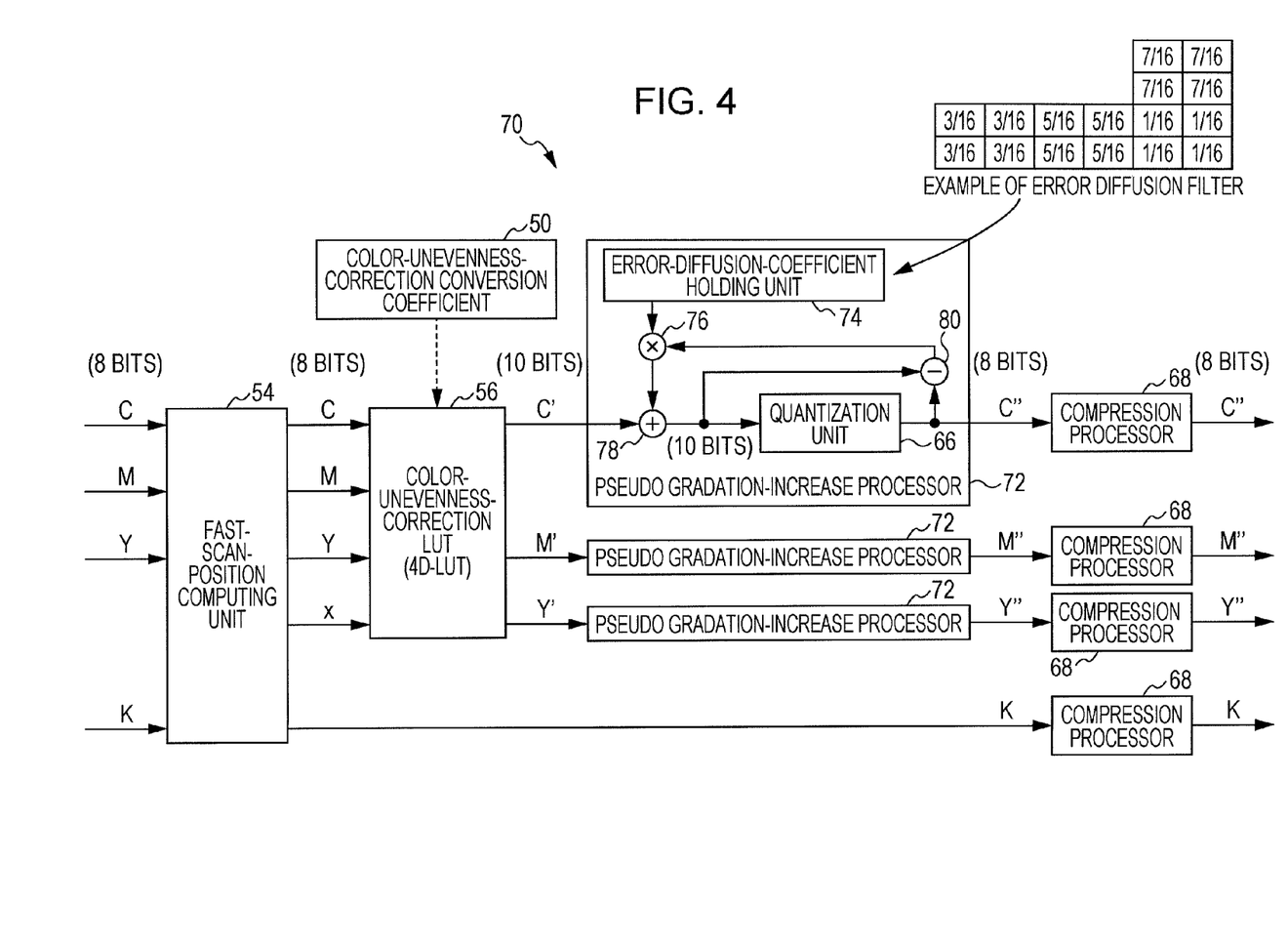
FIG. 4 is a block diagram schematically showing a configuration of an image processing device according to a second exemplary embodiment.

Next, a second exemplary embodiment of the invention is described. Like numerals refer like components in the first exemplary embodiment and redundant description is omitted. Described here is only part different from the first exemplary embodiment. FIG. 4 illustrates an image forming device 70 according to the second exemplary embodiment. The image forming device 70 includes a pseudo gradation-increase processor 72 instead of the pseudo gradation-increase processor 58 described in the first exemplary embodiment.

Described in the second exemplary embodiment is an aspect in which the fast-scan-position computing unit 54, the color-unevenness-correction LUT 56, the pseudo gradation-increase processor 72, and the compression processor 68 that form the image forming device 70 are provided in forms of hardware (electronic circuit). However, processing realized by the fast-scan-position computing unit 54, the color-unevenness-correction LUT 56, the pseudo gradation-increase processor 72, and the compression processor 68 may be realized according to an aspect in which a CPU of a computer (for example, the apparatus controller 12) executes a program. The program in this aspect is an example of an image processing program according to an exemplary embodiment of the present invention. The program in this aspect may be previously stored on (installed in) the storage unit 18. Alternatively, the program may be provided in a form of a storage medium, such as a CD-ROM or a DVD-ROM.

Three pseudo gradation-increase processors 72 according to the second exemplary embodiment are provided to correspond to data of the respective colors including C, M, and Y output from the color-unevenness-correction LUT 56. Data with mutually different colors of the three colors including C, M, and Y is input respectively to the three pseudo gradation-increase processor 58 pixel by pixel in order of a raster. The pseudo gradation-increase processor 72 according to the second exemplary embodiment performs pseudo gradation-increase processing by a multilevel error diffusion method for data (C', M', Y') having 10 bits per pixel per color expressing one of the three input colors including C, M, and Y; and outputs data having 8 bits per pixel per color pixel by pixel in order of the raster.

To be more specific, each of the pseudo gradation-increase processor 72 includes an error-diffusion-coefficient holding unit 74 that holds an error diffusion filter (an example of which is shown in FIG. 4) having set therein an error diffusion coefficient; a multiplier 76 that computes a value obtained by multiplying a quantization error by the error diffusion coefficient set in the error diffusion filter held in the error-diffusion-coefficient holding unit 74 and outputs the computation result as a correction value; an adder 78 that adds the correction value input from the multiplier 76 to data having 10 bits per pixel per color input from the color-unevenness-correction LUT 56; a quantization unit 66 that performs quantization processing of converting the data having 10 bits per pixel per color output from the adder 78 into data having 8 per color per pixel (rounding down 2 lower-order bits); and a subtractor 80 that subtracts data of a pixel (data having 10 bits per pixel per color) input to the quantization unit 66, from data of the same pixel having 8 bits per pixel per color output from the quantization unit 66, and outputs the computation result as a quantization error to the multiplier 76. The pseudo gradation-increase processor 72 is an example of a second output unit according to an exemplary embodiment of the invention.

Next, an operation of the second exemplary embodiment is described. The second exemplary embodiment performs the pseudo gradation-increase processing by the multilevel error diffusion method by the pseudo gradation-increase processor 72. Also, an error diffusion filter used for the pseudo gradation-increase processing by the multilevel error diffusion method is an error diffusion filter in which, when pixels that form the error diffusion filter are divided into plural pixel groups each including adjacent plural pixels, the same error diffusion value is set for the pixels while each pixel group serves as a unit, and a different error diffusion value is set for a different pixel group.

FIG. 4 illustrates an example of the error diffusion filter used in the second exemplary embodiment. The error diffusion filter shown in FIG. 4 is a filter with a shape in which a pixel group including 6 pixels in a fast scan direction (left-right direction in FIG. 4)×2 pixels in a slow scan direction (up-down direction in FIG. 4) is added to a lower side of a pixel group including 2 pixels in the fast scan direction×2 pixels in the slow scan direction such that right-end positions in the fast scan direction of these pixel groups are aligned with each other (16 pixels in total). Adjacent 4 pixels (2 pixels in the fast scan direction and 2 pixels in the slow scan direction) form a pixel group serving as a unit, and thus, the filter is divided into 4 pixel groups. Different error diffusion coefficients $7/16$, $3/16$, $5/16$, and $1/16$ are set respectively for the pixel groups. The same error diffusion coefficient is set for pixels in the same pixel group.

In the second exemplary embodiment, as shown in FIG. 4, since the pseudo gradation-increase processing by the multilevel error diffusion method is performed by using the error diffusion filter having set therein the same error diffusion coefficient for adjacent 4 pixels, the same value is added as a correction value by the error diffusion filter to pixels belonging to the same pixel group. Thus, as compared with a case in which an error diffusion filter having set therein different values as error diffusion coefficients for pixels is used, a difference between values of colors of pixels belonging to the same pixel group may be decreased on average by the error diffusion filter. The compression rate of image data in the downstream compression processing is increased.

In the first exemplary embodiment, the dither matrix (see FIG. 3A) having the size of 4×4 pixels and having set therein the same offset value while the pixel group of 2×2 pixels serves as a unit is described. However, the size and shape of the dither matrix, and the size of shape of the pixel group are not limited thereto. For example, the number of pixels in the fast scan direction of the dither matrix or the pixel group may be different from the number of pixels in the slow scan direction.

In particular, the dither matrix according to an exemplary embodiment of the invention, the compression rate for image data in the downstream compression processing is increased by making values of colors of pixels after the pseudo gradation-increase processing be the same or similar to each other while a pixel group serves as a unit. If the downstream compression processing is an algorithm that references the continuity of the values of the colors of the pixels only in one of the fast scan direction and the slow scan direction, even though the values of the colors of pixels that are adjacent to each other in a direction intersecting with the direction in which the continuity of the values of the colors of the pixels is referenced are made be the same or similar to each other, this does not make a contribution to increase in compression rate. In such a case, a pixel group may have a shape in which plural pixels are continuously arranged only in the direction in which the continuity of the values of the colors of the pixels is referenced in the compression processing.

With the dither matrix according to an exemplary embodiment of the invention, the compression rate in the downstream compression processing is increased as the size of the pixel group is increased. As described above, however, the pixels belonging to the same pixel group have the same value or values similar to each other. If the size of the pixel group is too large, pixel groups may be visually recognized as blocks with the same color or colors similar to each other, on an image after the pseudo gradation-increase processing by the dither method. The inventors of the subject application recognizes that pixel groups are not visually recognized as blocks with the same color or colors similar to each other if density of the pixel groups is 150 dpi or higher on an image, by an experiment. The size of a pixel group is desirably set such that the density of pixel groups on an image is equal to or higher than 150 dpi. For example, when the image recording resolution of the image forming device 32 is 600 dpi, if the dither matrix shown in FIG. 3A is used, the density of the same pixel group becomes 300 dpi, which is higher than 150 dpi. Thus, the pixel group is not visually recognized as a block. The above-described density is an example according to an exemplary embodiment of the invention.

With the dither matrix shown in FIG. 3A, the same offset value is set for pixels belonging to the same pixel group. However, offset values respectively set for pixels belonging to the same pixel group may differ from each other. If the offset values set for the pixels belonging to the same pixel group are values similar to each other (values with small differences) as compared with offset values set for pixels belonging to a different pixel group, the compression rate of image data in the downstream compression processing is increased.

Further, the size of the error diffusion filter described in the second exemplary embodiment, and the size and shape of the pixel group that forms the error diffusion filter are not limited to the example shown in FIG. 4. For example, if the downstream compression processing is an algorithm that references the continuity of the values of the colors of the pixels only in one of the fast scan direction and the slow scan direction, the pixel group that forms the error diffusion filter may have a shape in which plural pixels are continuously arranged only in a direction in which the continuity of the values of the colors of the pixels are referenced by the compression processing. Regarding the error diffusion filter, error diffusion coefficients set for respective pixels belonging to the same pixel group may differ from each other. If the error diffusion coefficients set for the pixels belonging to the same pixel group are values similar to each other (values with small differences) as compared with error diffusion coefficients set for pixels belonging to a different pixel group, the compression rate of image data in the downstream compression processing is increased. Further, also in the case of the error diffusion filter, the compression rate of the downstream compression processing is increased as the size of the pixel group is increased. The size of a pixel group is desirably set such that the density of pixel groups on an image is equal to or higher than 150 dpi. The above-described density is an example according to an exemplary embodiment of the invention.

The color-unevenness correction is described as an example of "predetermined image processing" according to an exemplary embodiment of the invention. However, the image processing may be image processing of outputting image data with a larger number of bits per pixel than the number of bits of image data that is finally output. To be more specific, image processing capable of realizing increase in processing accuracy by increasing the gradation resolution (by increasing the number of bits per pixel) is desirable, such as color-space conversion processing (for example, 4D LUT for CMYK-to-CMYK conversion, 3D LUT for RGB-to-CMYK conversion or L*a*b*-to-CMYK conversion, 1D LUT for gradation adjustment and calibration, or the like) of converting input image data into image data of a color space depending on an output device that outputs an image, or color separation processing of converting input image data into image data expressing a color of each pixel of an image by using a combination of values of a larger number of colors (for example, colors with light cyan (LC) and light magenta (LM) added).

Also, in the above description, image data having 10 bits per pixel per color is input to the pseudo gradation-increase processor 58, 72 serving as the second output unit according to an exemplary embodiment of the invention (i.e., m=10), and image data having 8 bits per pixel per color is output from the pseudo gradation-increase processor 58, 72 (i.e., n=8). The number of bits m, n per pixel may be desirably determined within a range that satisfies "n<m." For example, image data input to the pseudo gradation-increase processor 58, 72 may be image data having 16 bits per pixel per color.

Further, the image processing according to an exemplary embodiment is performed for image data expressing a color of each pixel of an image by using a combination of values of respective colors including C, M, Y, and K. The color space of the image data subjected to the image processing according to the exemplary embodiment of the invention may be a desirable color space, such as RGB, L*a*b*, or XYZ.

In the above description, the compression processor 68, as an example of a compression unit, compresses image data by a lossless compression method. The present invention is not limited thereto. The compression unit may have a configuration that compresses image data by a lossy compression method. In this case, image quality is increased with the same compression ratio. This exemplary embodiment is included in the invention.

EXAMPLE

Next, an experiment performed by the inventors of the subject application is described to check the effect of the exemplary embodiment of the invention. The inventors of the subject application performs plural kinds of processing (described later) for plural images (images A to F) and performs an experiment that compares file volumes after the compression processing, to ensure that a compression rate of an image in the downstream compression processing is increased if the pseudo gradation-increase processing by the multilevel error diffusion method using the error diffusion filter shown in FIG. 4, which is an example of an error diffusion filter to which the invention is applied, is performed for image data having 10 bits per pixel per color after the color-unevenness correction by the color-unevenness LUT 56.

Figure 5A:
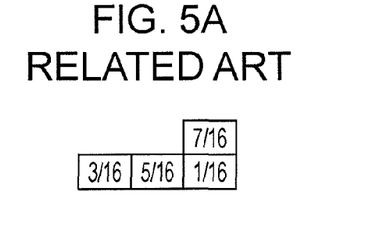
FIGS. 5A to 5C are diagrams showing results of an experiment executed by the inventors of the subject application.

The plural kinds of processing includes (1) quantization is performed such that image data having 10 bits per pixel per color after the color-unevenness correction is converted into image data having 8 bits per pixel per color by rounding down lower-order 2 bits, and then compression processing is performed (i.e., a reference system without the pseudo gradation-increase processing); (2) quantization is performed such that image data having 10 bits per pixel per color after the color-unevenness correction is converted into image data having 8 bits per pixel per color by rounding down lower-order 2 bits, the pseudo gradation-increase processing by the multilevel error diffusion method by using a typical error diffusion filter (an error diffusion filter having set therein different error diffusion coefficients respectively for pixels, see FIG. 5A showing an example of a typical error diffusion filter used in related art) is performed, and then compression processing is performed (a system according to related art); and (3) quantization is performed such that image data having 10 bits per pixel per color after the color-unevenness correction is converted into image data having 8 bits per pixel per color by rounding down lower-order 2 bits, the pseudo gradation-increase processing by the multilevel error diffusion method by using an error diffusion filter to which an exemplary embodiment of the invention is applied (see FIG. 3A) is performed, and then compression processing is performed (a system according to an exemplary embodiment of the invention).

Figure 5B:
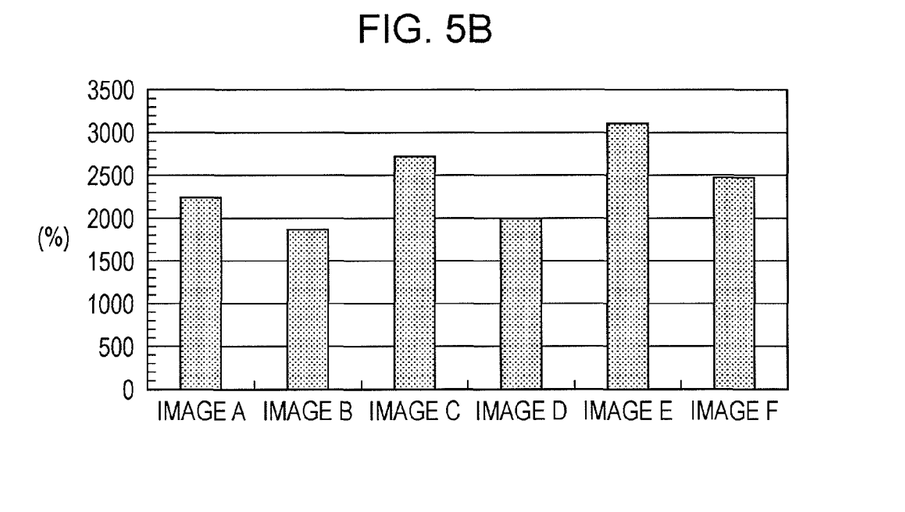
Figure 5C:
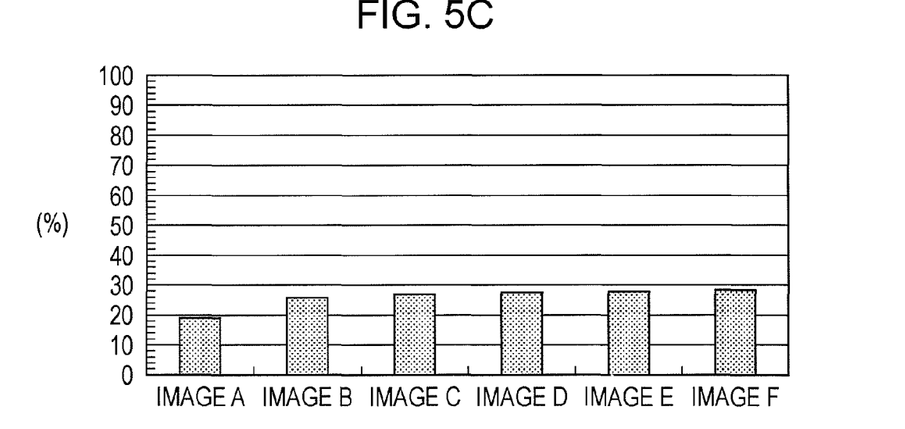

FIG. 5B illustrates ratios of file volumes of the system according to related art to file volumes of the reference system without the pseudo gradation-increase processing. As shown in FIG. 5B, the file volumes of the system according to the related art are about 20 to about 30 times the file volumes of the reference system although the ratios vary depending on the images. The compression rate of the compression processing is markedly decreased. FIG. 5C illustrates ratios of file volumes of the system according to the exemplary embodiment of the invention to the file volumes of the system according to the related art. As shown in FIG. 5C, the file volumes of the system according to the exemplary embodiment of the invention is about 20% to about 30% (about ⅕ to about ⅓) of the file volumes of the system according to the related art. The compression rate of the compression processing is markedly increased. The file volumes of the system according to the exemplary embodiment of the invention are larger than the file volumes of the reference system. However, with the reference system, the quantization error is visually recognized as the pseudo contour because the pseudo gradation-increase processing is not performed, whereas with the system according to the exemplary embodiment of the invention, the quantization error is prevented from being visually recognized as the pseudo contour because the pseudo gradation-increase processing is performed. The image quality is increased.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing device, comprising:
    a first output unit that performs predetermined image processing for image data, and outputs image data having m bits per pixel;
    a second output unit that performs pseudo gradation-increase processing by a dither method or a multilevel error diffusion method for the image data output from the first output unit, and outputs image data having n bits per pixel, where n<m; and
    a compression unit that compresses the image data output from the second output unit,
    wherein, when a dither matrix that the second output unit uses for the pseudo gradation-increase processing by the dither method or a filter that the second output unit uses for the pseudo gradation-increase processing by the multilevel error diffusion method is divided into a plurality of pixel groups each including a plurality of adjacent pixels and when each of the pixel groups serves as a unit, processing parameters of the dither matrix or the filter respectively set for pixels in the same pixel group are similar to each other as compared with processing parameters respectively set for pixels in different pixel groups.

2. The image processing device according to claim 1,
    wherein the compression unit has a configuration that compresses the image data based on continuity of values of pixels arranged in a predetermined scanning direction, and
    wherein the pixel group has a shape in which a plurality of pixels are continuously arranged at least in a direction corresponding to the scanning direction.

3. The image processing device according to claim 1, wherein, for the image data output from the first output unit, the second output unit performs processing of adding offset values, which serve as the processing parameters respectively set for the pixels of the dither matrix, to a plurality of pieces of image data respectively corresponding to the pixels of the dither matrix as the pseudo gradation-increase processing by the dither method, and then replaces the m-bit image data with the n-bit image data.

4. The image processing device according to claim 1, wherein, for the image data output from the first output unit, the second output unit replaces the m-bit image data with the n-bit image data, and performs processing of adding values obtained by multiplying errors of the n-bit pixel data after the replacement with respect to the m-bit image data before the replacement by coefficients, which serve as the processing parameters respectively set for the pixels of the filter, to a plurality of pieces of the image data before the replacement respectively corresponding to the pixels of the filter.

5. The image processing device according to claim 1, wherein the compression unit compresses the image data output from the second output unit by a lossless compression system.

6. The image processing device according to claim 1, wherein the processing parameters respectively set for the pixels in the same pixel group of the dither matrix or the filter is the same value when each pixel group serves as a unit.

7. The image processing device according to claim 1,
    wherein the image data compressed by the compression unit is transferred to an image forming unit, and is used for image formation with colorants of a plurality of colors by the image forming unit, and
    wherein the pixel groups each have a predetermined size such that a density of the pixel groups on an image formed by the image forming unit is 150 dpi or higher.

8. The image processing device according to claim 1,
    wherein the image data compressed by the compression unit is transferred to an image forming unit, and is used for image formation with colorants of a plurality of colors by the image forming unit,
    wherein image data expressing colors of respective pixels of an image by combinations of values of the plurality of colors is input pixel by pixel as the image data, and position data expressing positions of the pixels on the image with the data input is also input, and
    wherein the first output unit performs correction processing, as the image processing, that corrects unevenness of each of the colorants of the plurality of colors of the image formed by the image forming unit.

9. A non-transitory computer readable medium storing a program causing a computer to execute a process for image processing, the process comprising:
    performing predetermined image processing for image data, and first-outputting image data having m bits per pixel;
    performing pseudo gradation-increase processing by a dither method or a multilevel error diffusion method for the first-output image data, and second-outputting image data having n bits per pixel, where n<m; and
    compressing the second-output image data,
    wherein, when a dither matrix used for the pseudo gradation-increase processing by the dither method or a filter used for the pseudo gradation-increase processing by the multilevel error diffusion method is divided into a plurality of pixel groups each including a plurality of adjacent pixels and when each of the pixel groups serves as a unit, processing parameters of the dither matrix or the filter respectively set for pixels in the same pixel group are similar to each other as compared with processing parameters respectively set for pixels in different pixel groups.

10. An image processing method, comprising:

performing predetermined image processing for image data, and first-outputting image data having m bits per pixel;

performing pseudo gradation-increase processing by a dither method or a multilevel error diffusion method for the first-output image data, and second-outputting image data having n bits per pixel, where n<m; and compressing the second-output image data, wherein, when a dither matrix used for the pseudo gradation-increase processing by the dither method or a filter used for the pseudo gradation-increase processing by the multilevel error diffusion method is divided into a plurality of pixel groups each including a plurality of adjacent pixels and when each of the pixel groups serves as a unit, processing parameters of the dither matrix or the filter respectively set for pixels in the same pixel group are similar to each other as compared with processing parameters respectively set for pixels in different pixel groups.

* * * * *